(12) United States Patent
Illikkal et al.

(10) Patent No.: US 7,289,445 B2
(45) Date of Patent: Oct. 30, 2007

(54) MANAGING A PROTOCOL CONTROL BLOCK CACHE IN A NETWORK DEVICE

(75) Inventors: Rameshkumar G. Illikkal, Portland, OR (US); Ian Taylor, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1066 days.

(21) Appl. No.: 10/304,392

(22) Filed: Nov. 25, 2002

(65) Prior Publication Data

US 2004/0100907 A1    May 27, 2004

(51) Int. Cl.
     *H04L 12/26*     (2006.01)

(52) U.S. Cl. ........................................ 370/235; 711/118

(58) Field of Classification Search ................ 370/235; 711/133, 134, 135, 136, 118, 125; 709/230
See application file for complete search history.

(56) References Cited

U.S. PATENT DOCUMENTS

| 6,681,283 | B1 * | 1/2004 | Thekkath et al. ........... 710/305 |
| 6,820,127 | B2 * | 11/2004 | Banerjee ..................... 709/230 |
| 6,889,181 | B2 * | 5/2005 | Kerr et al. ..................... 703/27 |
| 6,898,180 | B2 * | 5/2005 | Kinnunen ................... 370/230 |
| 7,032,072 | B1 * | 4/2006 | Quinn et al. ................ 711/118 |
| 2004/0062245 | A1 * | 4/2004 | Sharp et al. ................ 370/392 |

* cited by examiner

*Primary Examiner*—Min Jung
(74) *Attorney, Agent, or Firm*—Kacvinsky LLC

(57) ABSTRACT

A method and apparatus to manage a PCB cache are described.

35 Claims, 3 Drawing Sheets

MANAGING A PROTOCOL CONTROL BLOCK CACHE IN A NETWORK DEVICE

BACKGROUND

A cache may be used to speed up the search and retrieval of data from memory. Cache management techniques may significantly impact the performance advantages of the cache. Consequently, there may be need for improvements in such techniques in a device for network processing at higher data rates.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Embodiments of the invention may comprise a method and apparatus to manage a cache in a network, such as a network endpoint. In one embodiment of the invention the cache may store, for example, one or more entries having information associated with a Protocol Control Block (PCB). An example of a PCB may be a Transport Control Block (TCB). In one embodiment of the invention, a packet of information may be received. A flow identifier may be extracted from the packet. A determination may be made as to whether a PCB entry associated with the flow identifier exists in the cache. The cache may be updated using a credit based algorithm in accordance with the determination. By managing the cache using a credit based algorithm, the embodiment may improve performance of a network, particularly with respect to processing Transmission Control Protocol (TCP) connections.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

Figure 1:
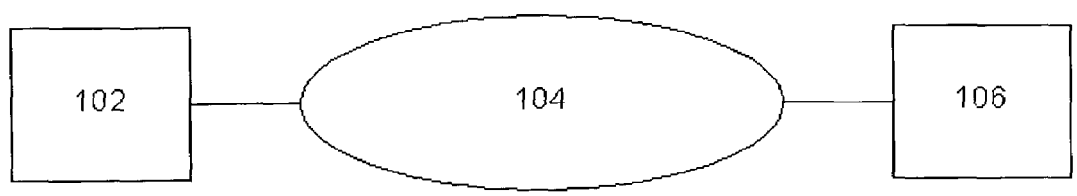
FIG. 1 illustrates a system suitable for practicing one embodiment of the invention.

Referring now in detail to the drawings wherein like parts are designated by like reference numerals throughout, there is illustrated in FIG. 1 a system suitable for practicing one embodiment of the invention. FIG. 1 is a block diagram of a system 100 comprising a number of network nodes connected by one or more communications media. A network node ("node") in this context may include any device capable of communicating information, such as a computer, server, switch, router, bridge, gateway, personal digital assistant, mobile device and so forth. A communications medium may include any medium capable of carrying information signals, such as twisted-pair wire, co-axial cable, fiber optics, radio frequencies, electronic, acoustic or optical signals, and so forth.

More particularly, system 100 may comprise a source node 102 connected to a destination node 106 via a network 104. Although FIG. 1 shows only one source node and one destination node for purposes of clarity, it can be appreciated that any number of network nodes may be used in system 100 and still fall within the scope of the invention. Furthermore, the terms "connection" and "interconnection," and variations thereof, in this context may refer to physical connections and/or logical connections.

In one embodiment of the invention, system 100 may comprise a packet network. A packet network may communicate information in the form of relatively short packets in accordance with one or more communications protocols. A packet in this context may refer to a set of information of a limited length, with the length typically represented in terms of bits or bytes. An example of a packet length might be 1000 bytes. A protocol may comprise a set of instructions by which the information signals are communicated over the communications medium. For example, the protocol might be the TCP as defined by the Internet Engineering Task Force (IETF) standard 7, Request For Comment (RFC) 793, adopted in September, 1981 ("TCP Specification"), and the Internet Protocol (IP) as defined by the IETF standard 5, RFC 791, adopted in September, 1981 ("IP Specification"), both available from "www.ietf.org" (collectively referred to as the "TCP/IP Specification").

In one embodiment of the invention, source node 102 may comprise a node that originates a set of information for delivery to destination node 106. Destination node 106 may comprise a node that is the intended recipient of the information. The information may be communicated between source node 102 and destination node 106 through network 104. Network 104 may comprise, for example, one or more intermediate nodes. Information may comprise any data capable of being represented as a signal, such as an electrical signal, optical signal, acoustical signal and so forth. Examples of information in this context may include data from a voice conversation, videoconference, streaming video, electronic mail ("email") message, voice mail message, alphanumeric symbols, graphics, image, video, text and so forth.

In general operation, source node 102 may send information to destination node 106 through network 104 in accordance with the IP Specification. The source node breaks a set of information into a series of packets. A particular series of packets may be referred to as a "connection" or "packet flow." Each packet may contain a portion of the information plus some control information. The control information may assist intermediate nodes in the network to route each packet to the destination node. Source node 102 may send the packets to destination node 106 via one or more intermediate nodes that are part of network 104. Destination node 106 may eventually receive the entire series of packets and may use them to reproduce the original information sent by source node 102.

In one embodiment of the invention destination node 106 may be a server that terminates a relatively large number of flows. Packets from each flow may require some information to process the packet. As the number of packets and flows increases for a particular server, so does the time necessary to process each packet. To reduce processing time, destination node 106 may use a cache to store some information. Retrieving information from a cache is typically faster than retrieving the same information from other types of memory, such as a system memory. This may be because the cache is typically smaller than system memory, and therefore may be searched faster than system memory. Further, a cache may use "on chip" memory and therefore may reduce the substantial latency associated with "off chip" memory transactions.

In addition to the cache itself, the cache typically requires some form of management to perform such functions as storing information, updating information and removing information. A conventional cache management technique may use a Least Recently Used (LRU) replacement algorithm to manage information in a cache. The LRU replacement algorithm, however, may not work very well with a high number of connections. Further, the packets from interleaved flows may thrash the cache. One embodiment of the invention attempts to improve cache management by adding packet processing knowledge to the caching subsystem. This may be discussed further with reference to FIGS. 2 and 3.

Figure 2:
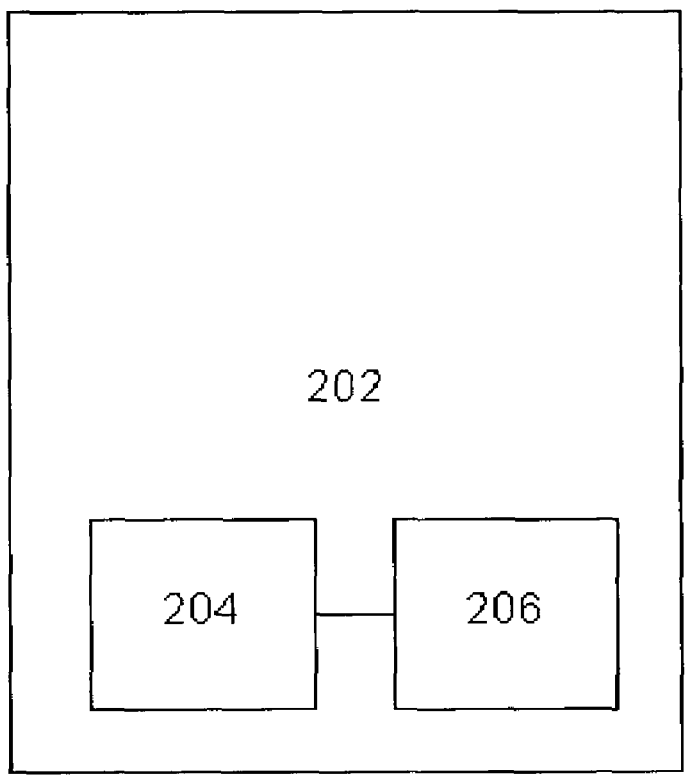
FIG. 2 illustrates a block diagram of a processing system in accordance with one embodiment of the invention.

FIG. 2 illustrates a block diagram of a processing system in accordance with one embodiment of the invention. FIG. 2 may illustrate a processing system 200. In one embodiment of the invention, processing system 200 may incorporate functionality that may be implemented as software executed by a processor, hardware circuits or structures, or a combination of both. The processor may be a general-purpose or dedicated processor, such as a processor from the family of processors made by Intel Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g, floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

In one embodiment of the invention, processing system 200 may comprise a network node. More particularly, processing system 200 may be a network node representative of, for example, destination node 106. In one embodiment of the invention, processing system 200 may comprise a server 202. Server 202 may further comprises a Cache Management Module (CMM) 204 and a cache 206. CMM 204 may be a software module or silicon logic that may be implemented, for example, as part of a TCP offloaded Network Interface Card (NIC) used in server 202. Cache 206 may be implemented using, for example, memory located on the NIC.

In one embodiment of the invention, server 202 may terminate multiple network connections from any number of network nodes, including source node 102. In some cases, server 202 may be configured to terminate a relatively large number of network connections from a large number of network nodes. This may occur, for example, if server 202 was part of a network data center. A network data center may comprise a large number of servers and/or network appliances, with each server configured to perform certain operations. For example, there may be servers configured to operate as web servers, web caches, image servers, database servers, load balancers, gateways and so forth. Server 202 may be representative of any network data center server that utilizes a cache.

In a typical network data center, servers may terminate thousands of simultaneous network connections. An example of a network connection may be a series of packets communicated in accordance with the TCP Specification ("TCP Connection"). Each TCP Connection may keep its context in a structure referred to as a Protocol Control Block (PCB). For each packet, a packet flow needs to be identified. Further, a PCB associated with the packet flow may need to be retrieved from memory. The PCB may be used to perform, for example, TCP protocol processing and state transitions. PCBs may be stored in a cache to improve search and retrieval times. As the number of TCP Connections increase, however, it may become difficult to keep PCBs cached long enough to make use of the temporal locality. The term "temporal locality" may refer to a characteristic of a referenced flow in which there is an increased tendency to reference a recent PCB in the near future. One embodiment of the invention may be directed to managing a PCB cache to improve cache performance.

In one embodiment of the invention, CMM 204 may manage a PCB cache using a credit based algorithm. CMM 204 may manage one or more PCB entries stored in, for example, cache 206. More particularly, CMM 204 may manage how PCB entries are created, updated and removed from cache 206. In general, the credit based algorithm may attempt to assign a credit parameter to each connection or packet flow, and use the credit parameter to determine when a PCB entry is removed from the cache.

A PCB entry may include any information associated with a PCB and desirable to improve cache performance. For example, a PCB entry may have a PCB, a flow identifier, a credit parameter, a time value, an invalid flag field and so forth. The PCB entry may be stored in the cache in any number of ways, including linked lists, arrays and other data structures, although the embodiments are not limited in this context.

In one embodiment of the invention, CMM 204 may invalidate any connections or flows that are no longer in use, e.g., terminated connections. As soon as a connection is closed locally, CMM 204 may mark the connection as invalid and remove the associated PCB entry as appropriate.

In one embodiment of the invention, CMM 204 may assign credit to packet flows that are desirable to keep in the cache. For example, CMM 204 may assign packet flows a credit parameter based on their expected duration. CMM 204 may assign a higher credit parameter to packet flows having a longer expected duration, and a lower credit parameter to packet flows having a shorter expected duration. CMM 204 may periodically update the credit parameter and use it to determine whether a particular PCB entry becomes invalid. The term "invalid" as used herein may refer to a PCB entry that is a candidate for removal from the cache. CMM 204 may periodically remove invalid PCB entries for a number of reasons such as to make room for a new PCB entry or in the course of routine cache maintenance. In the case of multiple invalid entries, an invalid PCB entry may be removed from the cache based on temporal considerations, e.g., the oldest invalid PCB entry may be removed first.

The operations of systems 100 and 200 may be further described with reference to FIG. 3 and accompanying examples. Although FIG. 3 as presented herein may include a particular processing logic, it can be appreciated that the processing logic merely provides an example of how the general functionality described herein can be implemented. Further, each operation within a given processing logic does not necessarily have to be executed in the order presented unless otherwise indicated.

Figure 3:
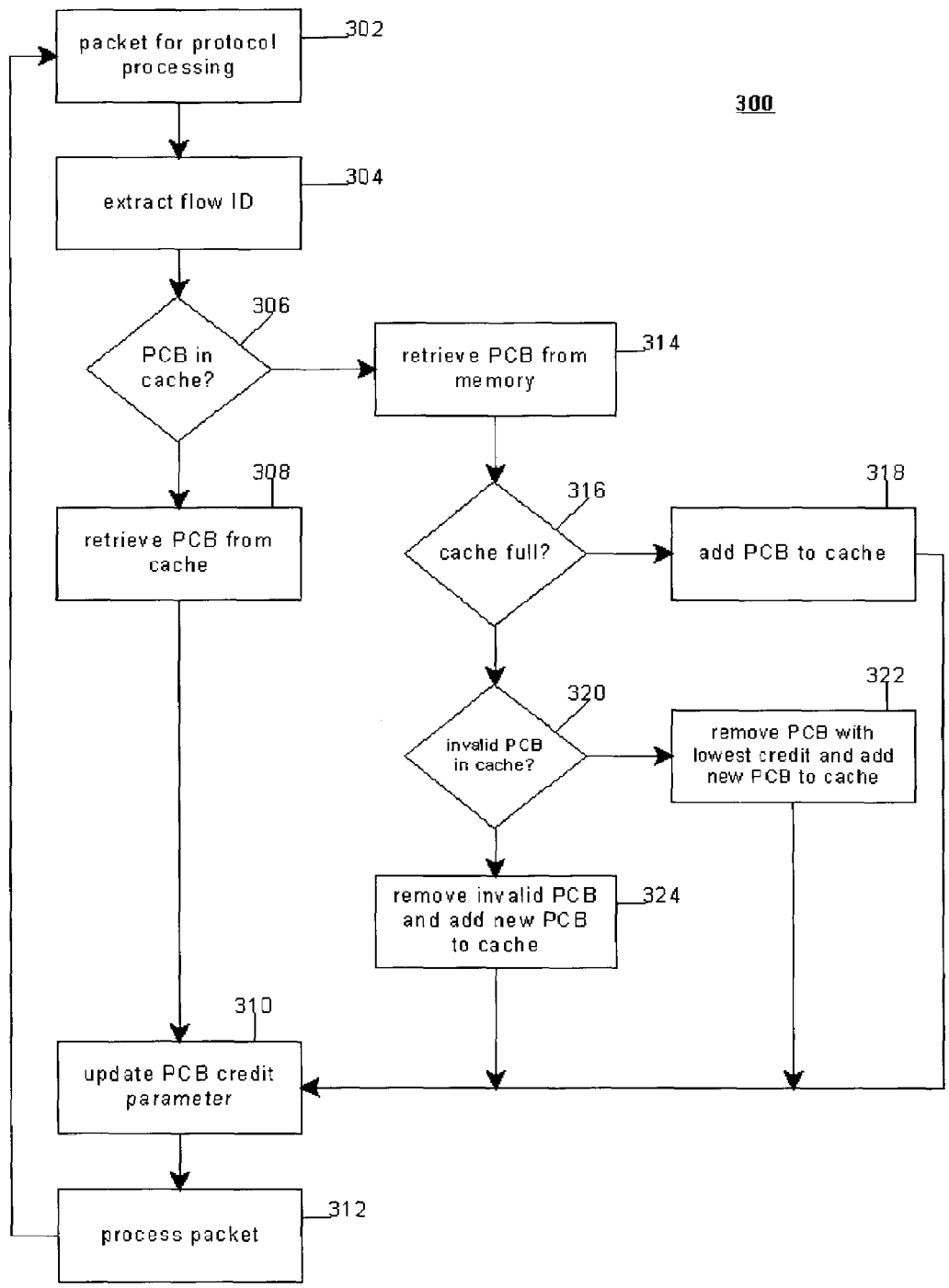
FIG. 3 is a block flow diagram of the processing logic for a Cache Management Module (CMM) in accordance with one embodiment of the invention.

FIG. 3 illustrates a block flow diagram of the processing logic for a CMM in accordance with one embodiment of the invention. In one embodiment of the invention, the CMM and other modules may refer to the software and/or hardware used to implement the functionality for one or more embodiments as described herein. In this embodiment of the invention, these modules may be implemented as part of a processing system, such as processing system 200. It can be appreciated that this functionality, however, may be implemented by any device, or combination of devices, located anywhere in a communication network and still fall within the scope of the invention.

Processing logic 300 may describe the processing logic to manage a cache. A send or receive packet may be received at block 302 for protocol processing. A packet flow identifier may be extracted from the packet at block 304. A determination may be made as to whether a PCB entry associated with the flow identifier is in a cache at block 306. The cache may be updated using a credit based algorithm in accordance with the determination made at block 306. For example, if there is a PCB entry in the cache at block 306, then the PCB entry may be modified. If there is not a PCB entry in the cache at block 306, then a PCB entry may be created.

In one embodiment of the invention, the PCB entry may be modified if it exists in the cache. A PCB may be retrieved from the PCB entry at block 308. A credit parameter associated with the PCB may be updated at block 310. The packet may then continue to be processed in a conventional manner at block 312.

In one embodiment of the invention, the PCB entry may be created if it does not exist in the cache. A PCB may be retrieved from memory at block 314. The memory may represent any memory not allocated to the cache. A determination may be made as to whether the cache is full at block 316. If the cache is not full, the PCB may be added to the cache in the form of a new PCB entry at block 318. A credit parameter may be assigned to the new PCB and added to the PCB entry as well at block 310.

In one embodiment of the invention, the credit parameter may be assigned to the new PCB entry as follows. A determination may be made as to which port number received the packet. A credit parameter table may store entries indexed by port number, with each entry having a predetermined credit parameter value associated with a particular port number. The credit parameter table may be searched using the port number. A credit parameter associated with the port number may be retrieved. The retrieved credit parameter may be assigned to the new PCB.

In one embodiment of the invention, the credit parameter may be assigned to the new PCB entry as follows. A determination may be made based on a TCP window size associated with the PCB. A credit parameter table may store entries indexed by the TCP window size, with each entry having a predetermined credit parameter value associated with a particular window size. The credit parameter table may be searched using the window size. A credit parameter associated with the window size may be retrieved. The retrieved credit parameter may be assigned to the PCB.

In one embodiment of the invention, a new PCB entry may be created as follows. A PCB may be retrieved from memory at block 314. The memory may represent any memory not allocated to the cache. A determination may be made as to whether the cache is full at block 316. If the cache is full at block 316, a determination may be made as whether an invalid PCB exists in the cache at block 320. If an invalid PCB exists in the cache at block 320, the invalid PCB entry may be removed from the cache and the new PCB may be added to the cache at block 324. A PCB credit parameter may be assigned to the new PCB at block 310 based on the TCP window size.

In one embodiment of the invention, an invalid PCB entry may be removed from the cache to make room for a new PCB entry. Identifying an invalid PCB entry may occur in a number of different ways. For example, in one embodiment of the invention a determination may be made as to whether a connection for a particular PCB entry has been terminated. A terminated connection may be identified on the receive side by receiving a FIN command from the source node. A FIN ACK command may be sent to the source node to acknowledge receipt of the FIN command. The credit parameter for the terminated connection may then be set to, for example, zero (0). A terminated connection may be identified on the send side by performing a local close, and sending a FIN command to the source node. A FIN ACK command may be received from the source node in response. The credit parameter for the terminated connection may then be set to, for example, one (1). In addition to modifying the credit parameter to indicate that a PCB is invalid, a separate field with a defined flag for valid and invalid may be stored with the PCB entry, although the embodiments are not limited in this context.

In one embodiment of the invention, an invalid PCB entry may be identified by comparing a credit parameter for each PCB entry with a predetermined value. For example, assume the predetermined value was less than or equal to one (1). If the credit parameter for a particular PCB entry was zero (0) or one (1), the PCB may be marked as invalid as discussed above. It can be appreciated that the predetermined value may be set to any desired level based on a particular implementation.

In one embodiment of the invention, a PCB entry may be removed based on temporal considerations, such as using a LRU replacement algorithm. Each PCB entry may have an associated time value representing, for example, when the PCB entry was last accessed. A PCB entry may be removed from the cache using this time value. For example, if there are multiple invalid PCB entries in the cache, then the invalid PCB entry with the oldest access time value may be removed first. If there are no invalid PCB entries in the cache, then a PCB entry with the oldest access time value may be removed from the cache to make room for the new PCB entry.

The operation of systems 100 and 200, and the processing logic shown in FIG. 3, may be better understood by way of example. Assume that server 202 processes hundreds if not thousands of TCP connections at any given time. Source node 102 communicates information in a packet flow to server 202. Server 202 receives a packet, and needs to determine to which packet flow it belongs. Server 202 extracts a packet flow identifier from the packet. Server 202 then needs the PCB associated with the packet flow. CMM 204 receives the flow identifier and searches cache 206 using the flow identifier. If a PCB entry with the flow identifier is found, the PCB may be retrieved from the PCB entry and used to perform, for example, TCP protocol processing. A credit parameter may be retrieved from the PCB entry and updated to reflect the transaction. For example, the credit parameter may be decremented by 1. After the course of a number of transactions, the credit parameter may eventually reach 0 and be marked as invalid.

If a PCB entry with the flow identifier is not found, CMM 204 checks to see if cache 206 is full. If the cache is not full, then a new PCB entry may be added to the cache. A credit parameter may be assigned to the new PCB and added to the PCB entry.

Assignment of the credit parameter may be based on a number of principles. For example, in one embodiment of the invention the credit parameter may be assigned based on window size as defined by the TCP/IP Specification. Window size information may be retrieved from the TCP stack. The TCP/IP Specification may define techniques to provide reliability through efficient flow control using "sliding windows." The sliding windows help reduce network congestion through slow start and congestion avoidance techniques. Usually a steady state is reached when the send side usable window accounts for the packet flight and receive side processing. Once an ACK command is received from the receive side, a usable window size is calculated from the congestion window size, advertised window size, and the acknowledged sequence number. This may result in back-to-back packet transmission of a relatively few packets depending on the outstanding bytes to be sent. Typically, the TCP stack sends as many packets in a flow as it can, depending on the outstanding bytes to send and the usable window size. As the number of simultaneous connections increase, each flow does not get serviced for every ACK. The ACKs may get subsequently queued up and processing occurs at a later time. This behavior may result in back-to-back packets sent out after an ACK is received. This increases the temporal locality of that flow.

One embodiment of the invention attempts to take advantage of the increased temporal locality of a flow by using the send side window information to increase the credit parameter for the flow. When an application sends data to the TCP layer, TCP may split the data up into a number of IP frames based on the maximum send side congestion window and the maximum transfer unit (MTU). Depending on the current window size, the server may send a few back-to-back TCP packets of the same flow until the window size is reached, or there is no more data to send. This improves the temporal locality of that flow momentarily. In order to make use of this, the credit parameter for the flow may be modified as follows:

$$\text{Credit Parameter} = \frac{\min[SendWindowsSize, OutstandingBytesToSend]}{MTUSize}$$

Every time a segment is sent on this flow, the credit parameter may be decreased until it reaches a predetermined value, e.g., zero (0). At this point the PCB may be marked as invalid.

CMM 204 may also assign a credit parameter based on port information. In a typical network data center environment, there may be two types of connections. The first connection may be referred to as a "short-lived connection" having relatively small messages. An example of a short-lived connection may be a Hypertext Transfer Protocol (HTTP) request. The second connection may be referred to as a "long-lived connection" having relatively large message. An example of a long-lived connection may be an Internet Small Computer System Interface (iSCSI) connection. Due to the data-intensive nature of the long-lived connections, there may be more temporal locality then the short-lived connections. To account for this, one embodiment of the invention may increase the credit parameter for flows servicing long-lived connections. The payload of a packet may be inspected to determine an application type. The application type may be matched with well-known port associations. For example, the flows connected to port 80 are usually HTTP flows, while most iSCSI implementations use port 5003. Similarly, additional categorization and crediting may be done to optimize performance by considering the relationship between various network applications and well-known ports for a particular implementation. This information may be stored in the credit parameter table for use in assigning a credit parameter to a new PCB.

At higher network speeds, the input/output (I/O) and memory bandwidth issues, as well as latency issues, may degrade system performance. By caching effectively, the embodiments of the invention may reduce the I/O and memory access burden and improve overall system performance. For example, assume a TCP offloaded NIC using system memory for storing PCB information. One embodiment of the invention may implement an effective caching system on the NIC that dynamically adapts to network traffic. This may reduce use of I/O and memory bandwidth. If a system integrates the TCP offload engine with the memory controller, or if a system utilizes processor based TCP stacks, the embodiments may manage a cache to reduce the use of memory bandwidth.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:
1. A method to manage a cache, comprising:
  receiving a packet;
  extracting a flow identifier from said packet;
  determining whether a Protocol Control Block (PCB) entry associated with said flow identifier is in a cache;
  updating said cache using a credit based algorithm in accordance with said determination;
  modifying said PCB entry if in said cache;
  creating said PCB entry if not in said cache; and
  assigning a credit parameter to said PCB;
  wherein said credit parameter is based on at least one of a port number receiving said packet or a window size for a connection.

2. The method of claim 1, wherein said modifying comprises:
retrieving a PCB from said PCB entry; and
updating a credit parameter associated with said PCB.

3. The method of claim 1, wherein said creating comprises:
retrieving a PCB from memory;
determining whether said cache is full; and
adding said PCB to said cache if said cache is not full.

4. The method of claim 3, wherein said assigning comprises:
determining a port number receiving said packet;
searching a credit parameter table using said port number;
retrieving a credit parameter associated with said port number; and
assigning said retrieved credit parameter to said PCB.

5. The method of claim 3, wherein said assigning comprises:
determining a window size for a connection associated with said PCB; searching a
credit parameter table using said window size;
retrieving a credit parameter associated with said window size; and
assigning said retrieved credit parameter to said PCB.

6. The method of claim 1, wherein said creating comprises:
retrieving a PCB from memory;
determining whether said cache is full;
removing a PCB entry from said cache if said PCB entry is invalid;
adding said PCB to said cache; and
assigning a credit parameter to said PCB.

7. The method of claim 6, wherein said removing comprises:
determining whether a connection for said PCB entry has been terminated; and
identifying said PCB entry having a terminated connection as invalid.

8. The method of claim 6, wherein said removing comprises:
comparing a credit parameter for each PCB entry with a predetermined value; and
identifying a PCB entry as invalid based on said comparison.

9. The method of claim 6, wherein said removing comprises:
identifying a number of invalid PCB entries in said cache, with each PCB entry having an associated time value representing when said PCB entry was created; and
removing a PCB entry using said time value.

10. The method of claim 6, wherein said assigning comprises:
determining a port number receiving said packet;
searching a credit parameter table using said port number;
retrieving a credit parameter associated with said port number; and
assigning said retrieved credit parameter to said PCB.

11. The method of claim 6, wherein said assigning comprises:
determining a window size for a connection associated with said PCB; searching a credit parameter table using said window size;
retrieving a credit parameter associated with said window size; and
assigning said retrieved credit parameter to said PCB.

12. An article comprising:
a computer readable storage medium;
said computer readable storage medium including stored instructions that, when executed by a computer, result in managing a cache by receiving a packet, extracting a flow identifier from said packet, determining whether a Protocol Control Block (PCB) entry associated with said flow identifier is in a cache, updating said cache using a credit based algorithm in accordance with said determination, modifying said PCB entry if in said cache, creating said PCB entry if not in said cache, and assigning a credit parameter to said PCB, wherein said credit parameter is based on at least one of a port number receiving said packet or a window size for a connection.

13. The article of claim 12, wherein the stored instructions, when executed by a computer, further result in said modifying by retrieving a PCB from said PCB entry, and updating a credit parameter associated with said PCB.

14. The article of claim 12, wherein the stored instructions, when executed by a computer, further result in said creating by retrieving a PCB from memory, determining whether said cache is full, and adding said PCB to said cache if said cache is not full.

15. The article of claim 14, wherein the stored instructions, when executed by a computer, further result in said assigning by determining a port number receiving said packet, searching a credit parameter table using said port number, retrieving a credit parameter associated with said port number, and assigning said retrieved credit parameter to said PCB.

16. The article of claim 14, wherein the stored instructions, when executed by a computer, further result in said assigning by determining a window size for a connection associated with said PCB, searching a credit parameter table using said window size, retrieving a credit parameter associated with said window size, and assigning said retrieved credit parameter to said PCB.

17. The article of claim 12, wherein the stored instructions, when executed by a computer, further result in said creating by retrieving a PCB from memory, determining whether said cache is full, removing a PCB entry from said cache if said PCB entry is invalid, adding said PCB to said cache, and assigning a credit parameter to said PCB.

18. The article of claim 17, wherein the stored instructions, when executed by a computer, further result in said removing by determining whether a connection for said PCB entry has been terminated, and identifying said PCB entry having a terminated connection as invalid.

19. The article of claim 17, wherein the stored instructions, when executed by a computer, further result in said removing by comparing a credit parameter for each PCB entry with a predetermined value, and identifying a PCB entry as invalid based on said comparison.

20. The article of claim 17, wherein the stored instructions, when executed by a computer, further result in said removing by identifying a number of invalid PCB entries in said cache, with each PCB entry having an associated time value representing when said PCB entry was created, and removing a PCB entry using said time value.

21. The article of claim 17, wherein the stored instructions, when executed by a computer, further result in said assigning by determining a port number receiving said packet, searching a credit parameter table using said port number, retrieving a credit parameter associated with said port number, and assigning said retrieved credit parameter to said PCB.

22. The article of claim 17, wherein the stored instructions, when executed by a computer, further result in said assigning by determining a window size for a connection associated with said PCB, searching a credit parameter table using said window size, retrieving a credit parameter associated with said window size, and assigning said retrieved credit parameter to said PCB.

23. A network node, comprising:
a cache to store PCB information; and
a cache management module to manage said PCB information;
wherein said cache management module assigns a credit parameter to said PCB information, said credit parameter based on at least one of a port number receiving a packet or a window size for a connection.

24. The network node of claim 23, wherein said cache management module determines whether to remove said PCB information from said cache using said credit parameter.

25. A system, comprising:
a processing platform adapted to manage a cache;
said platform being further adapted to receiving a packet, extracting a flow identifier from said packet, determining whether a Protocol Control Block (PCB) entry associated with said flow identifier is in a cache, updating said cache using a credit based algorithm in accordance with said determination, modifying said PCB entry if in said cache, creating said PCB entry if not in said cache, and assigning a credit parameter to said PCB, wherein said credit parameter is based on at least one of a port number receiving said packet or a window size for a connection.

26. The system of claim 25, wherein said platform is further adapted to perform said modifying by retrieving a PCB from said PCB entry, and updating a credit parameter associated with said PCB.

27. The system of claim 25, wherein said platform is further adapted to perform said creating by retrieving a PCB from memory, and determining whether said cache is full, adding said PCB to said cache if said cache is not full.

28. The system of claim 27, wherein said platform is further adapted to perform said assigning by determining a port number receiving said packet, searching a credit parameter table using said port number, retrieving a credit parameter associated with said port number, and assigning said retrieved credit parameter to said PCB.

29. The system of claim 27, wherein said platform is further adapted to perform said assigning by determining a window size for a connection associated with said PCB, searching a credit parameter table using said window size, retrieving a credit parameter associated with said window size, and assigning said retrieved credit parameter to said PCB.

30. The system of claim 27, wherein said platform is further adapted to perform said creating by retrieving a PCB from memory, determining whether said cache is full, removing a PCB entry from said cache if said PCB entry is invalid, adding said PCB to said cache, and assigning a credit parameter to said PCB.

31. The system of claim 30, wherein said platform is further adapted to perform said removing by determining whether a connection for said PCB entry has been terminated, and identifying said PCB entry having a terminated connection as invalid.

32. The system of claim 30, wherein said platform is further adapted to perform said removing by comparing a credit parameter for each PCB entry with a predetermined value, and identifying a PCB entry as invalid based on said comparison.

33. The system of claim 30, wherein said platform is further adapted to perform said removing by identifying a number of invalid PCB entries in said cache, with each PCB entry having an associated time value representing when said PCB entry was created, and removing a PCB entry using said time value.

34. The system of claim 30, wherein said platform is further adapted to perform said assigning by determining a port number receiving said packet, searching a credit parameter table using said port number, retrieving a credit parameter associated with said port number, and assigning said retrieved credit parameter to said PCB.

35. The system of claim 30, wherein said platform is further adapted to perform said assigning by determining a window size for a connection associated with said PCB, searching a credit parameter table using said window size, retrieving a credit parameter associated with said window size, and assigning said retrieved credit parameter to said PCB.

* * * * *

UNITED STATES PATENT AND TRADEMARK OFFICE
CERTIFICATE OF CORRECTION

PATENT NO. : 7,289,445 B2 Page 1 of 1
APPLICATION NO. : 10/304392
DATED : October 30, 2007
INVENTOR(S) : Illikkal et al.

It is certified that error appears in the above-identified patent and that said Letters Patent is hereby corrected as shown below:

In column 12, line 8, in Claim 30, delete "claim 27," and insert -- claim 25, --, therefor.

Signed and Sealed this

Twenty-sixth Day of August, 2008

JON W. DUDAS
*Director of the United States Patent and Trademark Office*